United States Patent
Liu et al.

(10) Patent No.: US 10,382,717 B2
(45) Date of Patent: Aug. 13, 2019

(54) VIDEO FILE PLAYBACK SYSTEM CAPABLE OF PREVIEWING IMAGE, METHOD THEREOF, AND COMPUTER PROGRAM PRODUCT

(71) Applicant: VIVOTEK INC., New Taipei (TW)

(72) Inventors: Chien-Wen Liu, New Taipei (TW);
Yen-Fu Lin, New Taipei (TW);
Shih-Wu Fanchiang, New Taipei (TW)

(73) Assignee: VIVOTEK INC., New Taipei (TW)

( * ) Notice: Subject to any disclaimer, the term of this patent is extended or adjusted under 35 U.S.C. 154(b) by 24 days.

(21) Appl. No.: 15/347,567

(22) Filed: Nov. 9, 2016

(65) Prior Publication Data
US 2017/0150093 A1 May 25, 2017

(30) Foreign Application Priority Data
Nov. 20, 2015 (TW) .............................. 104138647 A

(51) Int. Cl.
| | |
|---|---|
| *H04N 5/915* | (2006.01) |
| *G11B 27/00* | (2006.01) |
| *G11B 27/28* | (2006.01) |
| *G11B 27/36* | (2006.01) |

(52) U.S. Cl.
CPC ........... *H04N 5/915* (2013.01); *G11B 27/005* (2013.01); *G11B 27/28* (2013.01); *G11B 27/36* (2013.01)

(58) Field of Classification Search
CPC .............................. H04N 5/915; G06T 7/0022
See application file for complete search history.

(56) References Cited

U.S. PATENT DOCUMENTS

| | | | | | |
|---|---|---|---|---|---|
| 5,974,218 | A | * | 10/1999 | Nagasaka | G06F 17/30843 386/200 |
| 2005/0228849 | A1 | * | 10/2005 | Zhang | G06F 17/30787 709/200 |
| 2014/0333775 | A1 | * | 11/2014 | Naikal | H04N 7/181 348/159 |
| 2016/0078297 | A1 | * | 3/2016 | Wang | G11B 27/105 386/241 |

FOREIGN PATENT DOCUMENTS

| | | |
|---|---|---|
| TW | 200536389 | 11/2005 |
| TW | 201405327 | 2/2014 |

* cited by examiner

*Primary Examiner* — Girumsew Wendmagegn
(74) *Attorney, Agent, or Firm* — Andrew M. Calderon; Roberts Mlotkowski Safran Cole & Calderon, P.C.

(57) ABSTRACT

A video file playback system capable of previewing an image, a method thereof, and a computer program product can sequentially compare change amounts between chronological two of frame images, select the frame images, of which the change amounts exceed a preset value, in at least one time interval, and select a frame image, which has a maximum change amount, in the frame images in each time interval as a preview image. By displaying a preview image corresponding to each time interval, a user can quickly browse key images of each time interval.

15 Claims, 4 Drawing Sheets

VIDEO FILE PLAYBACK SYSTEM CAPABLE OF PREVIEWING IMAGE, METHOD THEREOF, AND COMPUTER PROGRAM PRODUCT

CROSS-REFERENCE TO RELATED APPLICATION

This non-provisional application claims priority under 35 U.S.C. § 119(a) to Patent Application No. 104138647 filed in Taiwan, R.O.C. on Nov. 20, 2015, the entire contents of which are hereby incorporated by reference.

BACKGROUND

Technical Field

The present invention relates to a video file playback system, and in particular, to a video file playback system capable of previewing an image, a method thereof, and a computer program product.

Related Art

Currently, to restrain crimes or traffic violations, a camera is generally installed in places, for example, shops, streets, or highways, to facilitate continuous video recording and monitoring. When an important event occurs, a recorded file can be played back to view images at incident time points. However, if a party does not know time when the event occurs, then to find the images at the incident time points, it needs to take a great amount of time and energy to watch images one by one, so that the images of the event can be found. Therefore, how to develop a video file playback system to assist a user in quickly and correctly finding images of the event in a scene from a large quantity of recorded images has become one of objectives of the monitoring industry.

SUMMARY

In view of the foregoing problem, embodiments of the present invention provide a video file playback system capable of previewing an image, a method thereof, and a computer program product, so that video segments in which an event may occur can be selected in a video file, and a preview image is provided corresponding to each video segment, so as to help a user quickly find wanted images.

The video file playback system capable of previewing an image includes a storage unit, a processing unit, and a display unit. The storage unit stores a video file, where the video file includes a plurality of frame images arranged according to a sequence of generation time; The processing unit is electrically connected to the storage unit, and is configured to sequentially compare change amounts between chronological two of the frame images, select the frame images, of which the change amounts exceed a preset value, in at least one time interval, and select a frame image, which has a maximum change amount, in the frame images in each time interval as a preview image. The display unit is electrically connected to the processing unit, and is configured to display the preview image corresponding to each time interval. In this way, a user has a great chance to watch an image of an incident key point on a preview image.

The video file playback method capable of previewing an image includes: reading a video file, where the video file includes a plurality of frame images arranged according to a sequence of generation time; sequentially comparing change amounts between chronological two of the frame images; selecting the frame images, of which the change amounts exceed a preset value, in at least one time interval; selecting a frame image, which has a maximum change amount, in the frame images in each time interval as a preview image; and displaying the preview image corresponding to each time interval.

The computer program product can complete the foregoing video file playback method capable of previewing an image after being loaded into a computer and is executed.

By means of the foregoing video file playback system capable of previewing an image, the method thereof, and the computer program product, using a frame image that has a maximum change amount as a preview image can help a user quickly browse segments and images that may possibly become incident key points in a video file.

BRIEF DESCRIPTION OF THE DRAWINGS

The present invention will become more fully understood from the detailed description given herein below for illustration only, and thus are not limitative of the present invention, and wherein.

DETAILED DESCRIPTION

Figure 1:
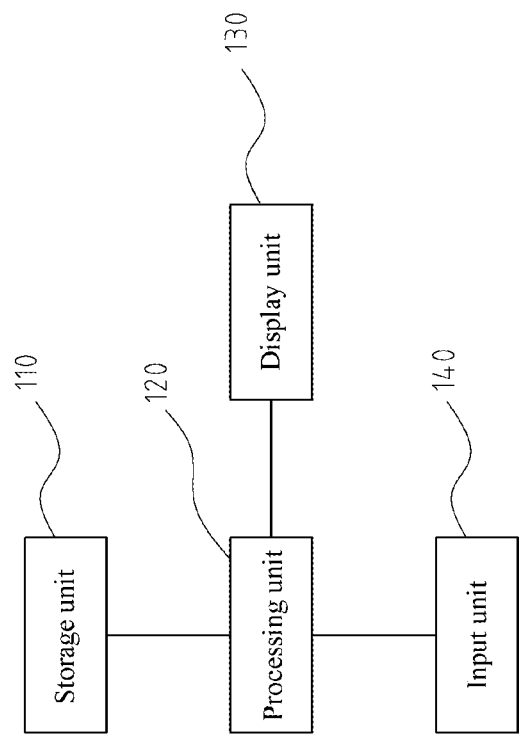
FIG. 1 is a schematic block diagram of a video file playback system capable of previewing an image of an embodiment of the present invention.

Referring to FIG. 1, FIG. 1 is a schematic block diagram of a video file playback system 100 capable of previewing an image ("video file playback system" in short in the following) of an embodiment of the present invention. The video file playback system 100 includes a storage unit 110, a processing unit 120, and a display unit 130. The display unit 130 is electrically connected to the processing unit 120, and the processing unit 120 is electrically connected to the storage unit 110. The storage unit 110 may be a storage medium, for example, a hard disk, a non-volatile memory (for example, an EEPROM), or a memory card (for example, an SD card). The display unit 130 may be a display, for example, a cathode ray tube display or a liquid crystal display, and may be also an image output apparatus, for example, a projector. The processing unit 120 is a processor having operational capabilities, for example, a microprocessor, a complex programmable logic device (CPLD), or a field-programmable gate array (FPGA). The video file playback system 100 can be substantively implemented by using a computer host (for example, a computer system based on an x86 architecture), or an embedded host (for example, an embedded system based on an advanced reduced instruction set computing machine (ARM), system-on-chips (SoC), or digital signal processor (DSP) architecture).

The storage unit 110 is configured to store a video file. The video file includes a plurality of frame images arranged according to a sequence of generation time. Formats of the video file may be audio video interleave (AVI), moving pictures experts group (MPEG), MOV, WMV, FLV, and the like. In some embodiments, the video file playback system 100 may further include a camera unit provided at a location where the camera unit is needed (not shown), for capturing images so as to generate the video file. The camera unit can be connected to the processing unit 120 and the storage unit 110 in wired and wireless manners. The processing unit 120 can store the video file generated by the camera unit into the storage unit 110, thereby generating the video file including the plurality of frame images arranged according to a sequence of generation time. If the camera unit is connected to the processing unit 120 and the storage unit 110 in a wireless manner, the video file playback system 100 needs to further include a wireless communication unit (not shown) electrically connected to the processing unit 120 for performing wireless communication with the camera unit, so as to receive the video file. The camera unit can be implemented by using a camera or other apparatuses capable of capturing images herein.

Figure 2:
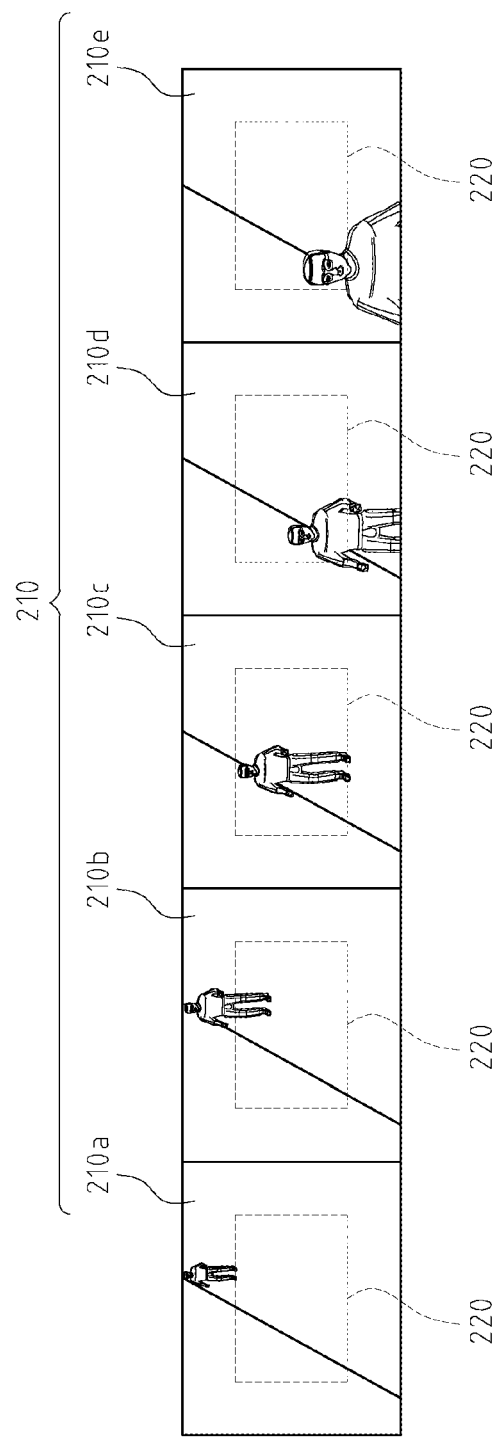
FIG. 2 is a schematic diagram of successive frame images in a selected time interval of an embodiment of the present invention.

Referring to FIG. 2, FIG. 2 is a schematic diagram of successive frame images in a selected time interval of an embodiment of the present invention. The processing unit 120 is configured to sequentially compare change amounts between chronological two of frame images 210a-210e (called 210 in general). The change amounts are total pixel changes or total brightness changes in the frame images 210 herein. That is, the processing unit 120 compares the change amounts of pixels or brightness between chronological two of the frame images 210. The total pixel changes include changes of total sums of gray-scale values or changes of separate color values of pixels. Using an RGB color mode as an example, the total pixel changes may be changes of total sums of red light values of pixels, changes of total sums of green light values of pixels, or changes of total sums of blue light values of pixels. However, this embodiment of the present invention is not limited thereto. If the color mode is a CMYK color mode, the total pixel changes may be also, for example, changes of total sums of cyan light values of pixels. If the change amounts exceed a preset value, the two frame images 210 are selected. In another embodiment, the change amounts of the present invention may be also change amounts of gray-scale values of total pixels in the frame images 210; when the change amounts exceed a preset value, the frame images 210 are selected. A manner for determining whether changes occur in two images is well known to common engineers skilled in the art, and details are not described again herein. Therefore, the processing unit 120 can select multiple frame images 210, of which the change amounts exceed a preset value, in one time interval. For an image, of which a change amount exceeds a preset value, it indicates that content of the image changes, and the image may be an image that a user needs to pay attention to.

In some embodiments, the change amounts may be also yes or no or quantity changes of skin color pixel values or detection objectives (for example, a human face), so as to find key images in which people occur.

Figure 3:
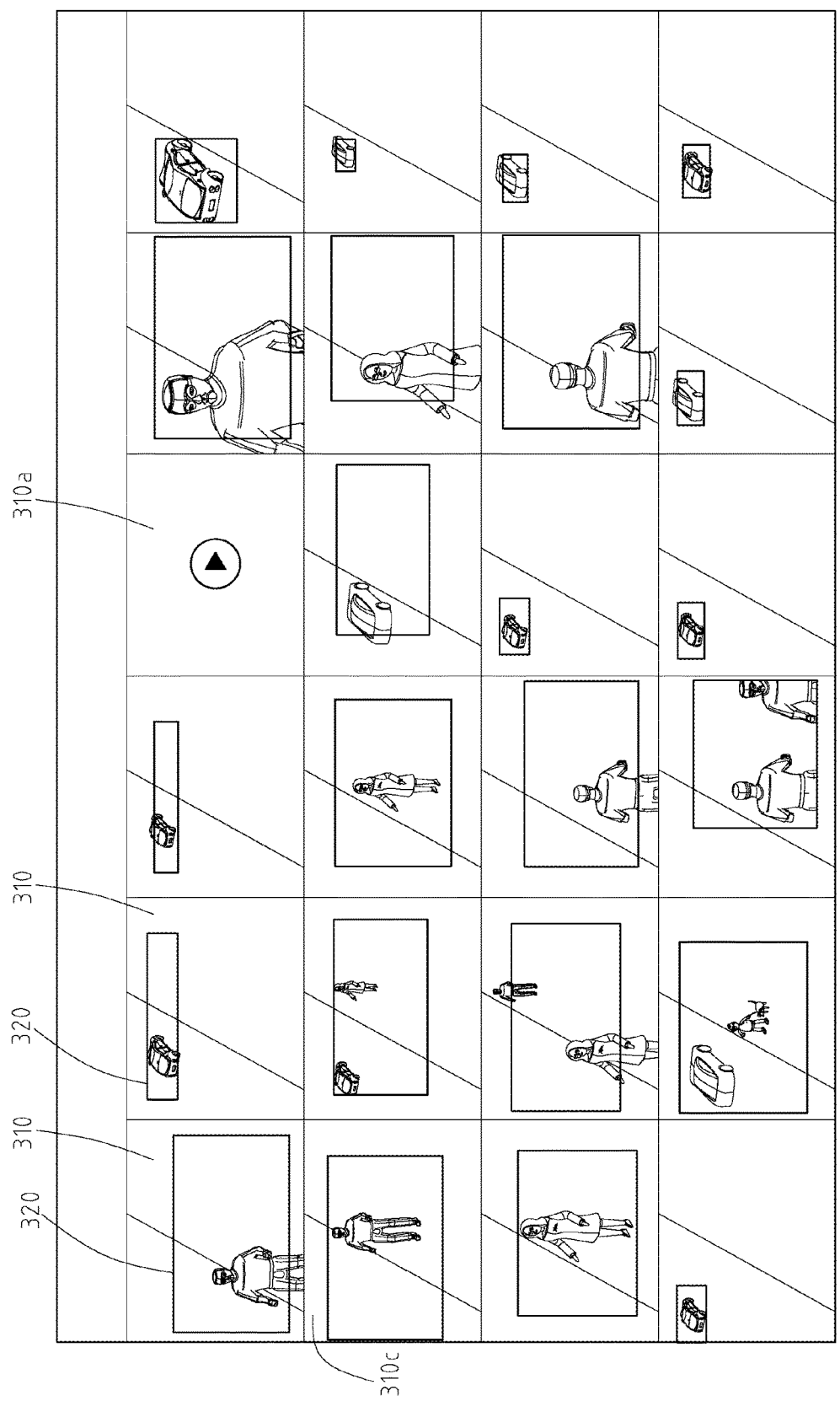
FIG. 3 is a schematic diagram of a preview image of an embodiment of the present invention.

Referring to FIG. 3, FIG. 3 is a schematic diagram of a preview image of an embodiment of the present invention. After selecting one or more time intervals in the video file, the processing unit 120 selects a frame image, which has a maximum change amount, in the frame images in each time interval as a preview image 310. The display unit 130 is configured to display the preview image 310 corresponding to each time interval. Referring to FIG. 2 in combination with FIG. 3, suppose a frame image 210c in FIG. 2 is a frame image, which has a maximum change amount, in the frame images 210a-210e, therefore the frame image 210c is used as a preview image and presented in the image shown in FIG. 3 (that is, a preview image 310c). Because a key image of an event is generally an image that has a maximum change amount as compared with images that are slightly earlier or later than the image, the image that has a maximum change amount is set as the preview image 310, so that a user can quickly browse a key image in each time interval. The user can click the key image to browse frame images in a corresponding time interval. For example, when the user clicks a preview image 310a therein, the corresponding frame images 210 are played.

In an embodiment, the processing unit 120, according to the foregoing manner for selecting a time interval, sequentially compares the change amounts of chronological two of the frame images 210 in a time interval, and selects the frame image, which has the maximum change amount as the preview image 310. In another embodiment, the processing unit 120 sequentially compares change amounts of gray-scale values of all pixels in chronological two of the frame images 210, and selects the frame image that has a maximum change amount of the gray-scale values as the preview image 310.

In another embodiment, the processing unit 120 uses a first frame image 210 in a time interval as reference (using FIG. 2 as an example, that is, the frame image 210a), and compares it with other frame images 210 (using FIG. 2 as an example, that is, the frame images 210b-210e) one by one so as to obtain the change amounts by comparison, and selects the frame image that has the maximum change amount as the preview image 310.

Referring to FIG. 2 again, the foregoing change amounts may be also total pixel changes or total brightness changes of one or more comparison areas 220 (using one comparison area 220 for example herein) of the frame images 210 in addition to the total pixel changes or total brightness changes of the entire frame images 210.

Referring to FIG. 1, the video file playback system 100 may further include an input unit 140, which is electrically connected to the processing unit 120. The input unit 140 is configured to select the foregoing comparison area 220 in the multiple frame images 210 for a user. The processing unit 120 only needs to sequentially compare the change amounts between the comparison areas 220 of the chronological two of the frame images, and select the frame images 210, of which the change amounts exceed the preset value, thereby reducing the calculation amount. The processing unit 120 can further compare the change amounts between the comparison areas 220 in the frame images 210 in each time interval, and select the frame image 210, which has the maximum change amount, in the comparison areas 220 as the preview image 310. The input unit 140 may be a mouse, a keyboard, a touchscreen, and the like.

Referring to FIG. 3, the processing unit 120 can compare value (for example, gray-scale values, separate color values, or brightness values) changes between corresponding pixels in chronological two of the frame images 210, and can find an area (called a "change area" in the following) where the change amount occurs in the preview image 310. Then, the processing unit 120 can generate at least one bounding region 320 on the preview image 310 to circle at least one change area. The display unit 130 can be configured to display the preview image 310 and the bounding region 320, so that the user can quickly browse the key image as well as notice the change area at first sight. As shown in FIG. 3, because a location and a size of the change area in each preview image 310 may differ from each other, a location and a size of the bounding region 320 of each preview image 310 may also differ from each other. In addition, the preview image 310 may include multiple change areas where image content changes; in this case, multiple bounding regiones 320 may be also generated to respectively mark the change areas, so that the user can notice the change areas where changes occur at first sight.

Figure 4:
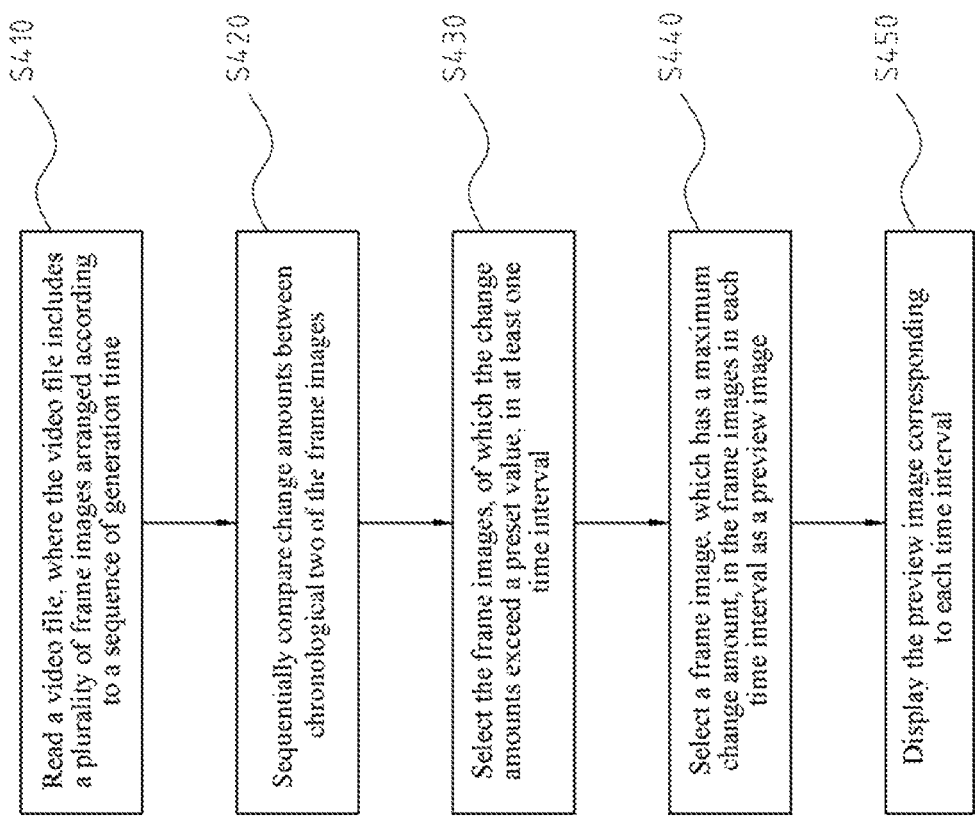
FIG. 4 is a flowchart of a video file playback method capable of previewing an image of an embodiment of the present invention.

Referring to FIG. 4, FIG. 4 is a flowchart of a video file playback method capable of previewing an image of an embodiment of the present invention, and the method can be executed by the foregoing video file playback system 100. That is, the foregoing storage unit 110 of the computer host can store a computer program product; after the computer program is loaded into the processing unit 120 of the compute host, the method shown in FIG. 4 can be executed. First, read a video file, where the video file includes a plurality of frame images 210 arranged according to a sequence of generation time (step S410). Second, sequentially compare change amounts between chronological two of the frame images 210 (step S420). At step S430, select the frame images 210, of which the change amounts exceed a preset value, in at least one time interval. However, at step S440, select a frame image 210, which has a maximum change amount, in the frame images 210 in each time interval as a preview image 310. Finally, at step S450, display the preview image 310 corresponding to each time interval.

In an embodiment, the foregoing step S440 is sequentially comparing the change amounts between the chronological two of the frame images 210 in the time interval, and selecting the frame image 210 that has the maximum change amount as the preview image 310.

In another embodiment, the foregoing step S440 is comparing the first frame image 210a with the other frame images 210 one by one in the time interval, so as to obtain the change amounts by comparison, and selecting the frame image 210 that has the maximum change amount as the preview image 310.

In an embodiment, before the foregoing step S450, at least one bounding region 320 can be further generated on the preview image 310 to circle at least one change area. Subsequently, at step S450, the bounding region 320 can be also displayed in addition to the preview image 310.

In an embodiment, before step S420, a comparison area 220 can be first selected in the frame images 210. However, step S420 is sequentially comparing the change amounts between the comparison areas 220 of the chronological two of the frame images 210. However, S440 is selecting the frame image 210, which has the maximum change amount, in the comparison areas 220 of the frame images 210 in each time interval as the preview image 310.

Therefore, according to the video file playback system capable of previewing an image, the method thereof, and the computer program product provided in the embodiments of the present invention, content in a video file can be actively filtered, and frame images 210, the difference (change amounts) between which and an original image exceeds a preset value are selected, and the frame image 210, which has the maximum difference (change amount), in the frame images 210 in each time interval is found as a preview image 310. In this way, a user can be helped to quickly browse segments and images that may possibly become incident key points in the video file.

What is claimed is:

1. A video file playback system capable of previewing an image, comprising:
    a storage unit, which stores a video file, wherein the video file comprises a plurality of frame images arranged according to a sequence of generation time;
    a processing unit, which is electrically connected to the storage unit, and is configured to sequentially compare change amounts between chronological two of the frame images, select the frame images, of which the change amounts exceed a preset value, in at least one time interval, and select a frame image, which has a maximum change amount, in the frame images in each at least one time interval as a preview image;
    a display unit, which is electrically connected to the processing unit, and is configured to display the preview image corresponding to each time interval, and
    an input unit, which is electrically connected to the processing unit, wherein the input unit is configured to select a comparison area on the plurality of frame images, and is further configured to sequentially compare the change amounts between the comparison areas of the chronological two of the frame images, select the frame images, of which the change amounts exceed the preset value, in the at least one time interval, and select the frame image, which has the maximum change amount, in the comparison areas of the frame images in each at least one time interval as the preview image.

2. The video file playback system capable of previewing an image according to claim 1, wherein the processing unit sequentially compares the change amounts between the chronological two of the frame images in the at least one time interval, and selects the frame image that has the maximum change amount as the preview image.

3. The video file playback system capable of previewing an image according to claim 1, wherein the processing unit compares the first one of the frame images with the other frame images in the at least one time interval, so as to obtain the change amounts by comparison, and selects the frame image that has the maximum change amount as the preview image.

4. The video file playback system capable of previewing an image according to claim 1, wherein the change amount is a total pixel change or a total brightness change in at least one area of the frame image.

5. The video file playback system capable of previewing an image according to claim 1, wherein the processing unit is further configured to generate at least one bounding region on the preview image to circle at least one change area, and the display unit is further configured to display the preview image and the least one bounding region, wherein the at least one change area is an area where the change amount occurs in the preview image.

6. A video file playback method of previewing an image, comprising:
    reading a video file, wherein the video file comprises a plurality of frame images arranged according to a sequence of generation time;
    selecting a comparison area on the plurality of frame images;
    sequentially comparing change amounts between the comparison areas of chronological two of the frame images;
    selecting the frame images, of which the change amounts exceed a preset value, in at least one time interval;
    selecting a frame image, which has a maximum change amount, in the comparison areas of the frame images in each at least one time interval as a preview image; and
    displaying the preview image corresponding to each time interval.

7. The video file playback method of previewing an image according to claim 6, wherein the step of selecting a frame image, which has a maximum change amount, in the frame images in each at least one time interval as a preview image is sequentially comparing the change amounts between the chronological two of the frame images in the at least one time interval, and selecting the frame image that has the maximum change amount as the preview image.

8. The video file playback method of previewing an image according to claim 6, wherein the step of selecting a frame image, which has a maximum change amount, in the frame images in each at least one time interval as a preview image is comparing the first one of the frame images with the other frame images in the at least one time interval, so as to obtain the change amounts by comparison, and selecting the frame image that has the maximum change amount as the preview image.

9. The video file playback method capable of previewing an image according to claim 6, wherein the change amount is a total pixel change or a total brightness change in at least one area of the frame image.

10. The video file playback method capable of previewing an image according to claim 6, further comprising:
   generating at least one bounding region on the preview image to circle at least one change area, wherein the at least one change area is an area where the change amount occurs in the preview image; and
   displaying the preview image and the least one bounding region.

11. A computer program product, which is stored on a non-transitory storage medium, when the computer program is loaded into a computer and is executed, a video file playback method capable of previewing an image can be completed, the video file playback method comprising:
   reading a video file, wherein the video file comprises a plurality of frame images arranged according to a sequence of generation time;
   selecting a comparison area on the plurality of frame images;
   sequentially comparing change amounts between the comparison areas of chronological two of the frame images;
   selecting the frame images, of which the change amounts exceed a preset value, in at least one time interval;
   selecting a frame image, which has a maximum change amount, in the comparison areas of the frame images in each at least one time interval as a preview image; and
   displaying the preview image corresponding to each time interval.

12. The computer program product according to claim 11, wherein the step of selecting a frame image, which has a maximum change amount, in the frame images in each at least one time interval as a preview image is sequentially comparing the change amounts between the chronological two of the frame images in the at least one time interval, and selecting the frame image that has the maximum change amount as the preview image.

13. The computer program product according to claim 11, wherein the step of selecting a frame image, which has a maximum change amount, in the frame images in each at least one time interval as a preview image is comparing the first one of the frame images with the other frame images in the at least one time interval, so as to obtain the change amounts by comparison, and selecting the frame image that has the maximum change amount as the preview image.

14. The computer program product according to claim 11, wherein the change amount is a total pixel change or a total brightness change in at least one area of the frame image.

15. The computer program product according to claim 11, wherein the video file playback method further comprises:
   generating at least one bounding region on the preview image to circle at least one change area, wherein the at least one change area is an area where the change amount occurs in the preview image; and
   displaying the preview image and the least one bounding region.

* * * * *